US012283741B2

(12) United States Patent
Ribeiro et al.

(10) Patent No.: US 12,283,741 B2
(45) Date of Patent: Apr. 22, 2025

(54) ANTENNA MOUNT FOR A STRUCTURE

(71) Applicant: UBICQUIA, INC., Fort Lauderdale, FL (US)

(72) Inventors: Claudio Santiago Ribeiro, Evanston, IL (US); Elliott Earl Murray, Plantation, FL (US); Patrick Stuart Claeys, Weston, FL (US); Travis Ronald Coleman, Sunrise, FL (US)

( * ) Notice: Subject to any disclaimer, the term of this patent is extended or adjusted under 35 U.S.C. 154(b) by 0 days.

(21) Appl. No.: 18/200,555

(22) Filed: May 22, 2023

(65) Prior Publication Data

US 2023/0378632 A1 Nov. 23, 2023

Related U.S. Application Data

(60) Provisional application No. 63/344,995, filed on May 23, 2022.

(51) Int. Cl.
*H01Q 1/12* (2006.01)

(52) U.S. Cl.
CPC .................................. *H01Q 1/1214* (2013.01)

(58) Field of Classification Search
CPC .................................................... H01Q 1/1214
See application file for complete search history.

(56) References Cited

U.S. PATENT DOCUMENTS 6,762,727 B2 * 7/2004 Rochford ............. H01Q 1/3275 24/289
7,002,523 B2 * 2/2006 Noro .................... H01Q 1/1214 343/702
7,091,912 B2 * 8/2006 Lacovella ............ H01Q 1/3275 343/711
2004/0183734 A1 9/2004 Noro
(Continued)

FOREIGN PATENT DOCUMENTS

EP 1329978 A1 7/2003
WO 2000035045 A1 6/2000

OTHER PUBLICATIONS

U.S. Patent & Trademark Office as International Searching Authority, International Search Report in connection with counterpart International Application No. PCT/US2023/023185, Aug. 15, 2023, 2 pages.

(Continued)

*Primary Examiner* — Anita M King
(74) *Attorney, Agent, or Firm* — Daniel C. Crilly

(57) ABSTRACT

A pass-through antenna mount for a structure includes a base to be placed against an external wall of the structure and a shaft that extends from the base through an opening in the wall. The base defines an aperture therethrough. The shaft extends away from the base and defines a hollow channel extending along a length thereof. The channel is generally aligned with the aperture in the base. The shaft includes a neck portion and an adjacent body portion. The neck portion is configured to accept a fastener and the body portion defines a cable opening in a wall thereof. The cable opening fluidly communicates with the hollow channel. The antenna mount accepts an antenna mounted to the base, where the antenna cable(s) passes through the shaft and exits through the cable opening of the shaft's body portion, thereby taking a tortuous path through the antenna mount.

17 Claims, 8 Drawing Sheets

(56) References Cited

U.S. PATENT DOCUMENTS

| | | | | |
|---|---|---|---|---|
| 2005/0006540 | A1 | 1/2005 | Takahashi | |
| 2006/0110214 | A1* | 5/2006 | Kozlovski | H01Q 1/3275 403/252 |
| 2009/0066593 | A1* | 3/2009 | Jared | H01Q 1/1214 343/713 |

OTHER PUBLICATIONS

U.S. Patent & Trademark Office as International Searching Authority, Written Opinion of the International Searching Authority in connection with counterpart International Application No. PCT/US2023/023185, Aug. 15, 2023, 5 pages.

* cited by examiner

ANTENNA MOUNT FOR A STRUCTURE

CROSS-REFERENCE TO RELATED APPLICATIONS

The present application claims the benefit of and priority upon U.S. Provisional Patent Application No. 63/344,995, which was filed on May 23, 2022, and is incorporated herein by this reference as if fully set forth herein.

TECHNICAL FIELD

The present disclosure relates generally to an antenna mount for a structure, and, more particularly, to an antenna mount that defines a tortuous path through which an antenna cable must pass to impede or block insertion of an object through the path and into a structure to which the antenna mount is mounted.

BACKGROUND

Structures such as pad mounted distribution transformers, cable provider equipment enclosures, Internet service provider equipment enclosures, and other utility enclosures, are common in neighborhoods having underground utilities. Such structures may be positioned on a concrete slab along a utility easement on residential property or other neighborhood property. It is desirable for utility personnel to be able to remotely monitor the equipment housed in the structures to identify problems that can be addressed before a failure occurs, as well as to know if a failure unexpectedly occurs.

To remotely monitor utility equipment, use of a wireless communication infrastructure is often required. Given the ubiquitous presence of cellular phone networks, a remote sensor or monitoring device may include a cellular modem to transmit and receive data and other messaging. However, given the nature of some utility equipment, the enclosures of such equipment may be made of metal in order to protect people from electrical shock. As a result, positioning an antenna inside the enclosure would be ineffective because radio signals would not pass through the enclosure walls or would be heavily attenuated if they did. Accordingly, an externally mounted antenna is necessary to communicate with a sensor or monitor inside the utility equipment enclosure. An externally mounted antenna requires connection to a cable that passes through a hole in the wall of the enclosure. This presents a problem in a scenario where the antenna is, for example, broken away from the enclosure structure, whether intentionally or unintentionally, because the hole in the structure wall may become accessible and subject to a person inserting something through the hole and into the utility equipment inside. Where the utility equipment is a pad mounted distribution transformer, insertion of a metal clothing hangar or piece of rebar could prove catastrophic if the inserted item came in contact with a primary or secondary bushing of the transformer.

SUMMARY

In accordance with an exemplary embodiment of the present disclosure, an antenna mount for a structure includes a base defining an aperture therethrough and a shaft extending away from the base. The shaft defines a hollow channel that extends along its length and is generally aligned with the aperture in the base. The shaft includes a neck portion configured to accept a fastener, and an adjacent body portion that defines a cable opening in a wall thereof. The cable opening fluidly communicates with the hollow channel.

In accordance with an alternative embodiment of the present disclosure, a distal end of the shaft may be sealed closed. Alternatively, the antenna mount may further include a plug removably attached to a distal end of the body portion of the shaft, where the plug is sized and shaped to seal closed the distal end of the body portion of the shaft. According to one exemplary embodiment in which the antenna mount includes a plug, the plug may include a threaded member and a head member located at one end of the threaded member. In this case, the head member is sized and shaped to seal closed the distal end of the body portion of the shaft when the threaded member of the plug is mated with a threaded inner surface of the body portion of the shaft at or proximate the body portion's distal end. Also in this case, the antenna mount may further include a collar sized and shaped to fit over the body portion of the shaft, where the collar is positioned between the head member of the plug and the neck portion of the shaft and at least a portion of the collar has an outer diameter that is less than a diameter of the head member of the plug. Further in this case, the antenna mount may also include a nut sized to fit onto and mate with a threaded outer surface of the neck portion of the shaft, where an inside diameter of the nut is larger than a maximum outside diameter of the collar and the diameter of the head member of the plug.

According to another exemplary embodiment of the present disclosure, the antenna mount may further include a nut sized to fit onto and mate with a threaded outer surface of the neck portion of the shaft. In such a case, the nut may define a gap in its wall, where a width of the gap is adequate to accommodate passage of a cable therethrough.

According to further exemplary embodiment of the present disclosure, at least the antenna mount's base is configured to facilitate attachment of an antenna assembly such that one or more cables of the antenna assembly pass through the aperture of the base and into the hollow channel of the antenna mount's shaft. Additionally or alternatively, the body portion of the antenna mount's shaft may be cylindrical, and the hollow channel of the shaft may be a bore. Further, the body portion of the antenna mount's shaft may have a smaller diameter than a diameter of the neck portion of the shaft.

According to further exemplary embodiment of the present disclosure, an antenna mount for a structure includes a substantially flat base that defines an opening therethrough, a shaft extending away from the base, and a plug. According to this embodiment, the shaft defines a bore extending along the shaft's length and the bore is generally aligned with the opening in the base. The shaft includes a neck portion and a body portion. One side of the neck portion is adjacent to the body portion and another side of the neck portion is adjacent to the base. An outside surface of the neck portion is threaded, and the body portion is open at a distal end and defines a slot in its wall. The slot fluidly communicates with the bore. The plug is removably attached to the body portion of the shaft through the open distal end of the body portion. The plug is sized and shaped to seal closed the open distal end of the body portion.

According to another exemplary embodiment of the present disclosure, an inner surface of the body portion of the shaft may be threaded proximate the distal end of the body portion. In such a case, the plug may include a threaded member and a head member located at one end of the threaded member. The head member may be sized and shaped to seal closed the distal end of the body portion of the shaft when the threaded member of the plug is mated with the threaded inner surface of the body portion. Additionally or alternatively, the plug may be attached to the body portion of the shaft so as to be unremovable in response to an impact force originating from the bore of the shaft. Further or alternatively, the antenna mount may include a collar sized and shaped to fit over the body portion of the shaft. In such a case, the collar may be positioned between a head member of the plug and the neck portion of the shaft, where at least a portion of the collar has an outer diameter that is less than a diameter of the head member of the plug. Additionally or alternatively, an end portion of the collar positioned closest to the head member of the plug may be tapered. Further, an outer surface of the neck portion of the shaft may be threaded. When so, the antenna mount may further include a nut sized to fit onto and mate with the threaded outer surface of the neck portion. In such a case, an inside diameter of the nut may be larger than a maximum outside diameter of the collar and the diameter of the head member of the plug. Additionally or alternatively, the nut may define a gap in its wall, where a width of the gap accommodates passage of a cable therethrough. Still further, a wall or surface of the antenna mount's base defining the opening in the base may be threaded to be mateable with a threaded portion of an antenna assembly.

In accordance with yet another exemplary embodiment of the present disclosure, an intrusion-resistant antenna mount for a structure is mountable through an aperture of the structure and includes a base having an opening therethrough and a tortuous path arrangement connected to and extending away from the base. According to this embodiment, the tortuous path arrangement includes a shaft, a cylindrical collar, and a plug. The shaft defines a hollow cable channel extending along the shaft's length and being generally aligned with the opening in the base. The shaft is open at a distal end and defines a cable opening in a wall thereof. The cable opening fluidly communicates with the cable channel. The collar is tapered at one or more ends and positioned over the shaft. The plug is removably attached to the distal end of the shaft and includes a head member sized and shaped to seal closed the distal end of the shaft. The head member has a diameter greater than a diameter of a tapered end of the collar.

Although the present disclosure illustrates and describes an antenna mount for a structure, it is, nevertheless, not intended to be limited to the details shown because various modifications and structural changes may be made therein without departing from the scope of the disclosure and while remaining within the scope and range of equivalents of the claims.

Features that are considered characteristic of the invention are set forth in the appended claims. As required, detailed embodiments of an antenna mount for a structure are disclosed herein; however, it is to be understood that the disclosed embodiments are merely exemplary, and the antenna mount may be embodied in various forms. Therefore, specific structural and functional details disclosed herein are not to be interpreted as limiting, but merely as a basis for the claims and as a representative basis for teaching one of ordinary skill in the art to variously employ the claimed invention in appropriately detailed structures. Further, the terms and phrases used herein are not intended to be limiting; but rather provide an understandable description of the disclosure. While the specification concludes with claims defining the features of the invention, it is believed that the claimed invention will be better understood from a consideration of the following description in conjunction with the drawing figures, in which like reference numerals are carried forward. The figures of the drawings are not drawn to scale.

The terminology used herein is for the purpose of describing particular embodiments only and is not intended to be limiting. The terms "a" or "an," as used herein, are defined as one or more than one. The term "plurality," as used herein, is defined as two or more. The term "another," as used herein, is defined as at least a second or more. The terms "including" and/or "having," as used herein mean "include, but not limited to." The term "providing" is defined herein in its broadest sense (e.g., bringing/coming into physical existence, making available, and/or supplying to someone or something, in whole or in multiple parts at once or over a period of time).

As used in this description, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present disclosure and simplify the description, but not to indicate or imply that the devices or components must have a specific azimuth, or be constructed or operated in the specific azimuth, which thus cannot be understood as a limitation to the embodiments of the present disclosure or the appended claims. Furthermore, terms such as "first", "second", "third" and so on are only used for identification purposes and are not to be construed as indicating or implying relative importance.

As used in this description, unless otherwise clearly defined and limited, terms such as "installed", "coupled", and "connected" should be broadly interpreted, for example, to mean fixedly connected, detachably connected, integrally connected; mechanically connected, electrically connected; directly connected, or indirectly connected via an intermediate medium.

In the absence of any specific clarification related to its express use in a particular context, where the terms "substantially," "approximately," "generally," or "about" are used as modifiers in the present disclosure and any appended claims (e.g., to modify a structure, a dimension, a measurement, a direction, an orientation, or any other characteristic), it is understood that the characteristic may vary by up to thirty percent. In these cases, a device that is mounted exactly orthogonal is mounted along a "Y" axis and a "X" axis that is normal (i.e., 90 degrees or at right angle) to a plane or line formed by a "Z" axis. Different from the exact precision of the term "orthogonal," the use of "substantially" or "about" to modify the characteristic permits a variance of the particular characteristic by up to thirty percent or such other amount as may be required by the context of the applicable description. As another example, an element or component that is oriented exactly opposite to another element or component is oriented one hundred eighty degrees from the other element or component. Different from the exact precision of the term "opposite," the use of "substantially" or "generally" to modify the orientation or direction permits a variance thereof by up to thirty percent (e.g., up to fifty-four degrees) or such other amount as may be stated in the applicable description or required by the context of the applicable description. Alternatively, these terms may refer to a range of numbers or quantities that one of skill in the art would consider equivalent to the recited values (i.e., having the same function or result). In many instances, these terms may include numbers that are rounded to the nearest significant figure.

In the present disclosure, the term "longitudinal" or "lengthwise" means in a direction corresponding to an elongated direction of the device or component. Those skilled in the art will understand the specific meanings of the above-mentioned terms and others in the embodiments of the present disclosure according to the described context, examples, and circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present disclosure.

DETAILED DESCRIPTION

An antenna mount for a structure allows an external antenna to be mounted on the structure, such as, for example, a pad mounted distribution transformer, a cabinet distribution transformer, a cable provider equipment enclosure, an Internet service provider equipment enclosure, or another utility enclosure. Through use of the disclosed antenna mount, a mounted antenna can be connected to a device inside the structure, such as a monitoring unit or sensor, and allow the device to communicate with a remote computing system. The disclosed antenna mount defines a tortuous path for the antenna cable so that in the event the antenna is removed from the outside of the structure to which it was mounted, an object inserted through the opening in the antenna mount is unlikely to contact sensitive electronics and potentially dangerous electrical connections within the structure.

Figure 1:
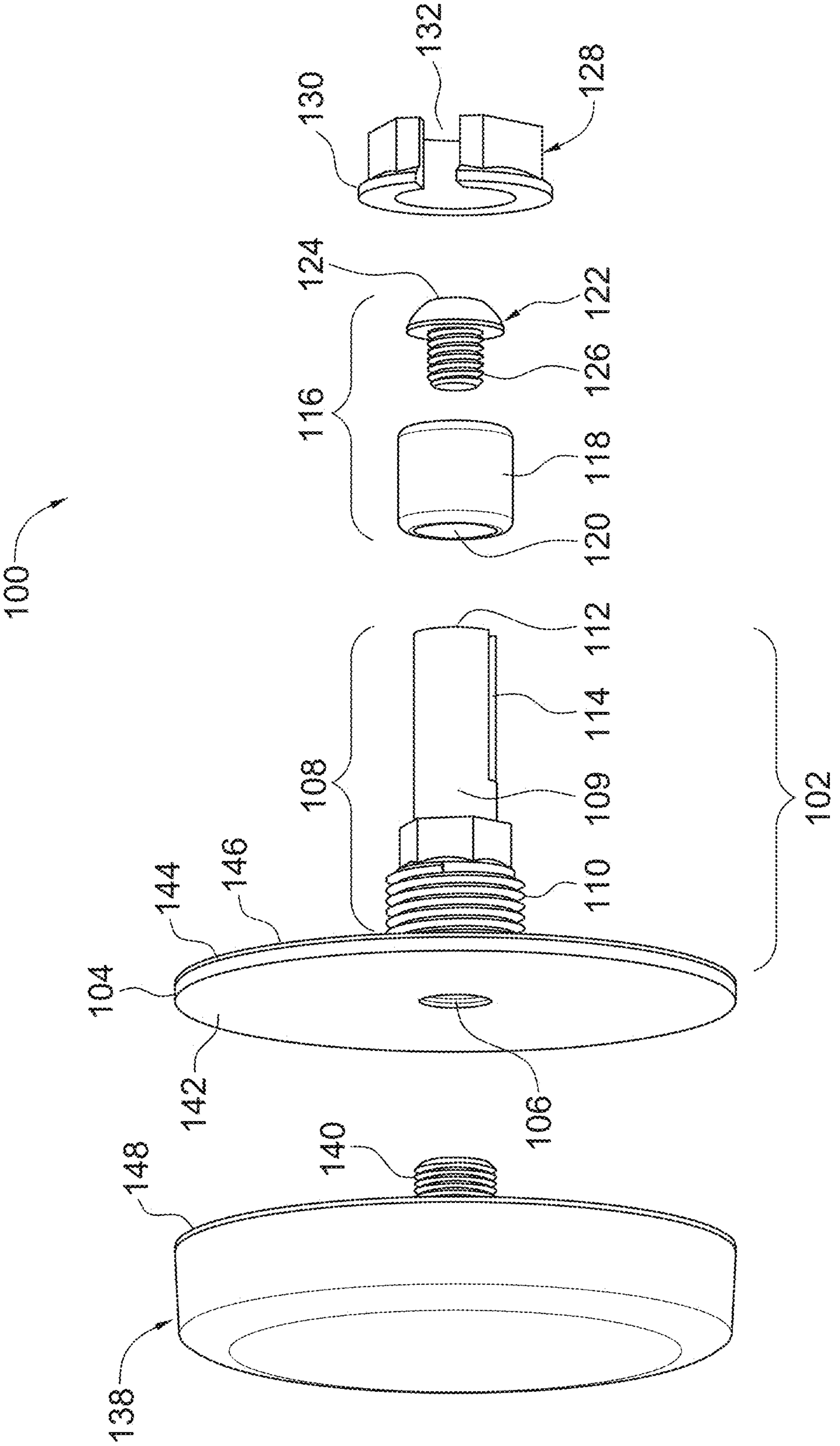
FIG. 1 is an exploded view of a structure-mountable antenna assembly, in accordance with exemplary embodiments of the present disclosure.

FIG. 1 is an exploded view of a structure-mountable antenna assembly, in accordance with exemplary embodiments of the present disclosure. The antenna assembly 100 includes an antenna mount 102 and an antenna 138. The antenna mount 102 includes a base 104 and a shaft 108 extending away from the base 104. The base 104 may be substantially flat or planar and have a front side 142 and a back side 144 separated by a thickness. The base 104 defines an aperture 106 through the thickness of the base 104.

The shaft 108 includes a neck portion 110 and an adjacent body portion 109 that extends from the neck portion 110. The neck portion 110 has a larger outside diameter than an outside diameter of the body portion 109. The neck portion 110 may be threaded on its external surface or otherwise configured to accept a fastener, such as a threaded or press-fit nut. The body portion 109 of the shaft 108 has a distal end 112 that is opposite the neck portion 110. The shaft 108 defines a hollow channel extending along a length thereof. The channel is generally aligned with the aperture 106 in the base 104. The body portion 109 of the shaft 108 defines a cable opening 114 in a wall thereof. The cable opening 114 fluidly communicates or is in fluid communication with the hollow channel of the shaft 108.

The antenna mount 102 may also include a removable plug assembly 116 that includes a collar 118 and a plug 122. The collar 118 may define a bore 120 through it and be sized and shaped to fit over the body portion 109 of the shaft 108. For example, the collar 118 may have an outside diameter that is greater than an outside diameter of the body portion 109 but less than an outside diameter of the neck portion 110. The plug 122 includes a head member 124 and a threaded member 126, where the head member 124 is located at one end of the threaded member 126. The threads on the threaded member 126 of the plug 122 are sized to mate with threads on an inner surface of the body portion 109 of the shaft 108 adjacent the distal end 112 of the shaft 108. In some embodiments, the hollow channel in the shaft 108 can be a bore through an entirety of the shaft 108, such that the distal end 112 of the body portion 109 of the shaft 108 is open. In such a case, the threaded member 126 of the plug 122 can be screwed into the distal end 112 of the body portion 109 to seal closed the distal end 112 of the body portion 109. The head member 124 of the plug 122 is sized and shaped to seal closed the distal end 112 of the body portion 109 of the shaft 108 when the threaded member 126 of the plug 122 is mated with the threaded inner surface of the body portion 109.

When included, the collar 118 has a length selected to cover a portion of the cable opening 114 in the wall of the body portion 109 of the shaft 108 so as to allow an antenna cable from an antenna 138 to pass through the hollow channel of the shaft 108 and out the cable opening 114 when the distal end 112 of the body portion 109 is sealed closed with the plug 122. Once out of the aperture 106 in the base 104, the antenna cable may be mated with a connector 140 of an antenna 138. When used, the collar 118 is positioned between the head member 124 of the plug 122 and the neck portion 110 of the shaft 108. Additionally, at least a portion of the collar 118 has an outer diameter that is less than a diameter of the head member 124 of the plug 122. Thus, once the collar 118 is slid over the body portion 109 of the shaft 108 and the plug 122 is secured to the distal end 112 of the body portion 109, the collar 118 cannot fall off the body portion 109 of the shaft 108. According to one exemplary embodiment as illustrated in FIG. 1, an end portion of the collar 118 nearest the head member 124 of the plug 122 may be tapered to have an outer diameter less than a diameter of the head member 124 of the plug 122. For simplicity in fabrication and to avoid mistakes during installation of the antenna mount 102, both end portions of the collar 118 may be tapered to have an outer diameter less than a diameter of the head member 124 of the plug 122.

The antenna mount 102 may further include a retaining nut 128 sized to fit onto and mate with the threaded outer surface of the neck portion 110 of the shaft 108. The nut 128 may also have an inside diameter larger than a maximum outside diameter of the collar 118 and the diameter of the head member 124 of the plug 122 to fit over the collar 118 and the plug 122 to facilitate attachment after the distal end 112 of the body portion 109 of the shaft 108 has be sealed closed. The retaining nut 128 may further define a gap 132 in a wall thereof, where the width of the gap 132 accommodates or allows an antenna cable to pass through it so that the cable does not get pinched during installation of the nut 128. The retaining nut 128 may further include a flange 130 that helps distribute force when securing the nut 128 against an inside of the structure in which the antenna mount 102 is mounted.

In a further exemplary embodiment, a gasket 146 may be placed on the back side 144 of the base 104 to bear against the exterior surface of the structure in which the antenna mount 102 is mounted. In such a case, when the retaining nut 128 is threaded onto the neck portion 110 of the shaft 108 and tightened against the interior side of the structure, the force will pull the back side 144 of the antenna mount base 104 against the external surface of the structure and compress the gasket 146.

The antenna 138 includes a connector 140 that may be threaded to mate with threads inside the shaft 108 near the base 104 after the antenna 138 is connected to the antenna cable. The antenna 138 may include a gasket 148 that will bear against the front side 142 of the antenna mount base 104 when the connector 140 is threaded into the shaft 108 through the aperture 106 in the base 104.

Figure 2:
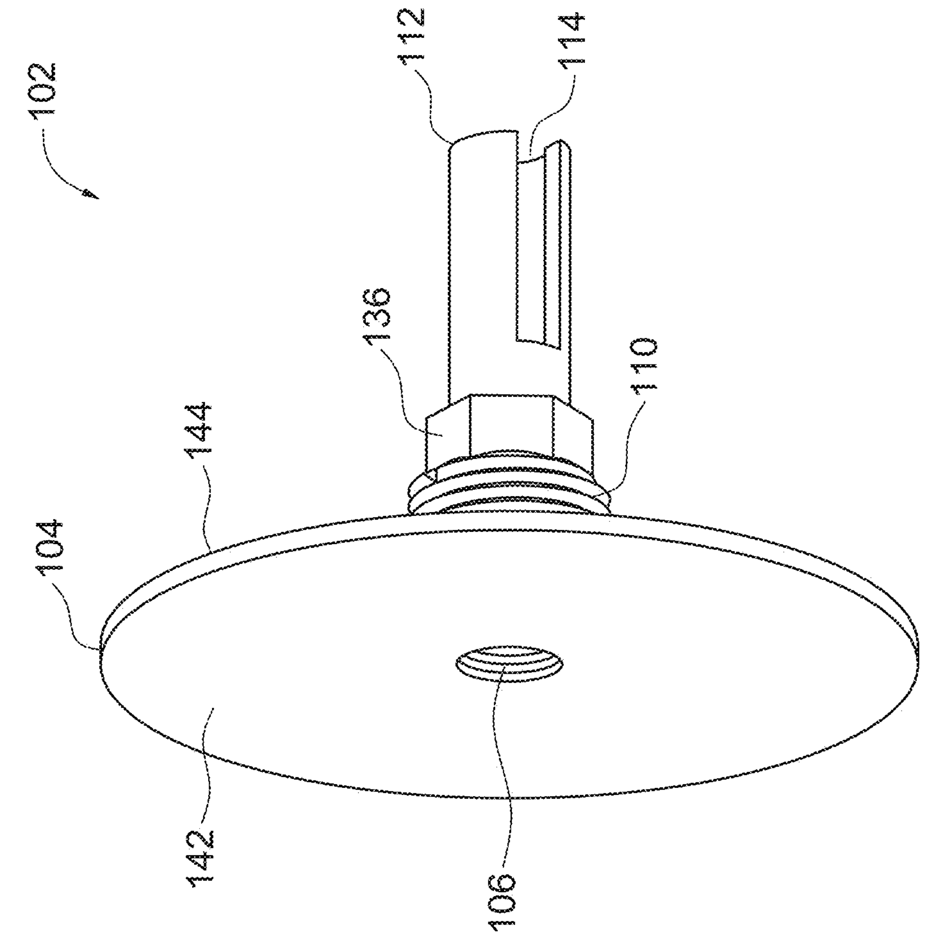
FIG. 2 is a perspective view of a partially assembled antenna mount for a structure, in accordance with another exemplary embodiment of the present disclosure.

FIG. 2 is a perspective view of a partially assembled alternative antenna mount 102. According to this embodiment, the antenna mount 102 further includes a nut 136 used to help prevent the base 104 from turning when the retaining nut 128 is tightened onto the neck portion 110 of the shaft 108.

Figure 3:
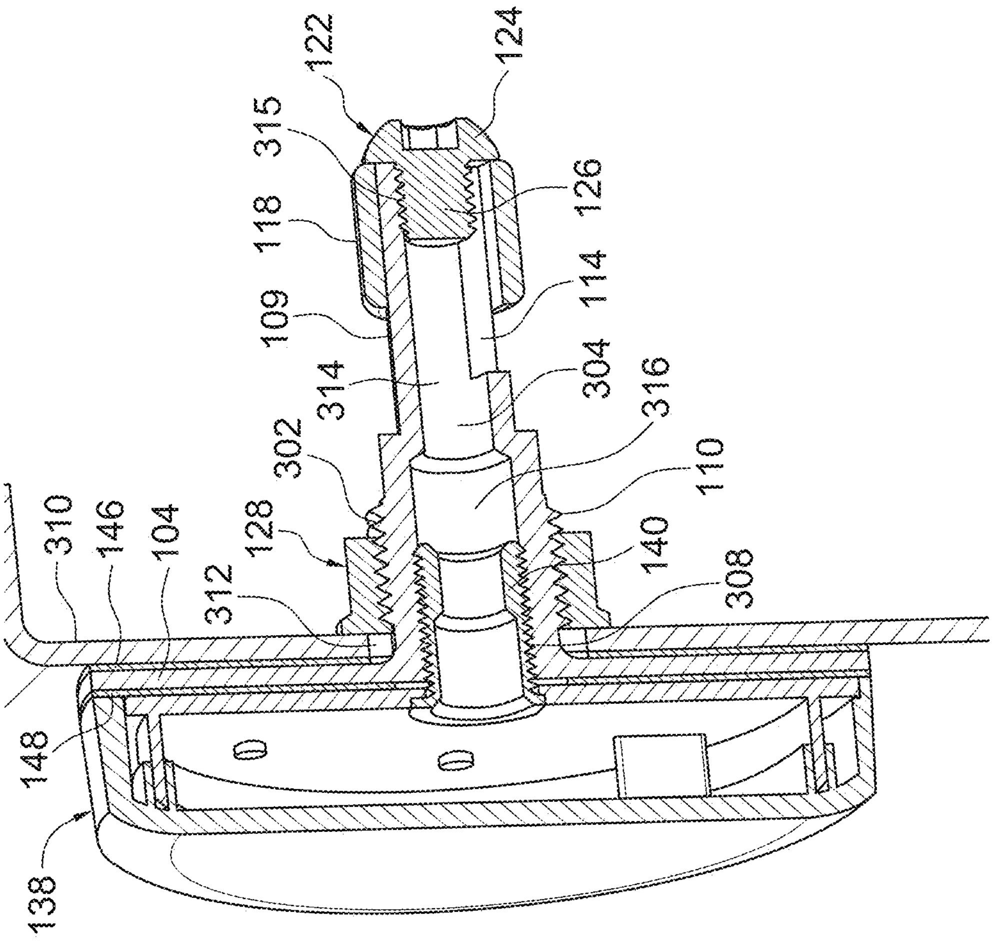
FIG. 3 is a cross-sectional and cutaway view of an antenna connected to an assembled antenna mount for a structure, in accordance with exemplary embodiments of the present disclosure.

FIG. 3 is a cross-sectional and cutaway view of an antenna 138 connected to an assembled antenna mount 102 for a structure, in accordance with exemplary embodiments of the present disclosure. In this view, the shaft 108 of the antenna mount 102 extends through an opening 312 in a wall 310 (e.g., a sidewall, front wall, back wall, top, cover, bottom, and so forth) of a structure. The antenna 138 is mounted into the antenna mount 102 by threading the antenna connector 140 into threads 308 inside the channel 314 of the shaft 108 proximate the aperture 106 in the base 104 of the antenna mount 102. The retaining nut 128 is threaded and tightened onto threads 302 of the neck portion 110 of the shaft 108 and the flange 130 of the nut 128 bears against the interior surface of the wall 310 of the structure.

The channel 314 through the shaft 108 is contiguous and in fluid communication with the cable opening 114 and the aperture 106 in the base 104. The channel 314 may have a first portion 316 and an adjacent second portion 304 that have different interior diameters. In this case, the diameter of the first channel portion 316 may be equal to the diameter of the aperture 106 in the base 104, and the diameter of the second channel portion 304 may be equal to a diameter of the opening at the distal end 112 of the shaft body portion 109. As shown in FIG. 3, the cable opening 114 in the side wall of the shaft body portion 109 may be a slot along the wall of the second channel portion 304. The interior of the cable channel 314 may include a threaded portion 315 adjacent or proximate the distal end 112 of the shaft body portion 109 to receive the threaded member 126 of the plug 122. The head member 124 of the plug 122 retains the collar 118 on the shaft 108 and leaves a portion of the cable opening 114 uncovered.

Figure 6:
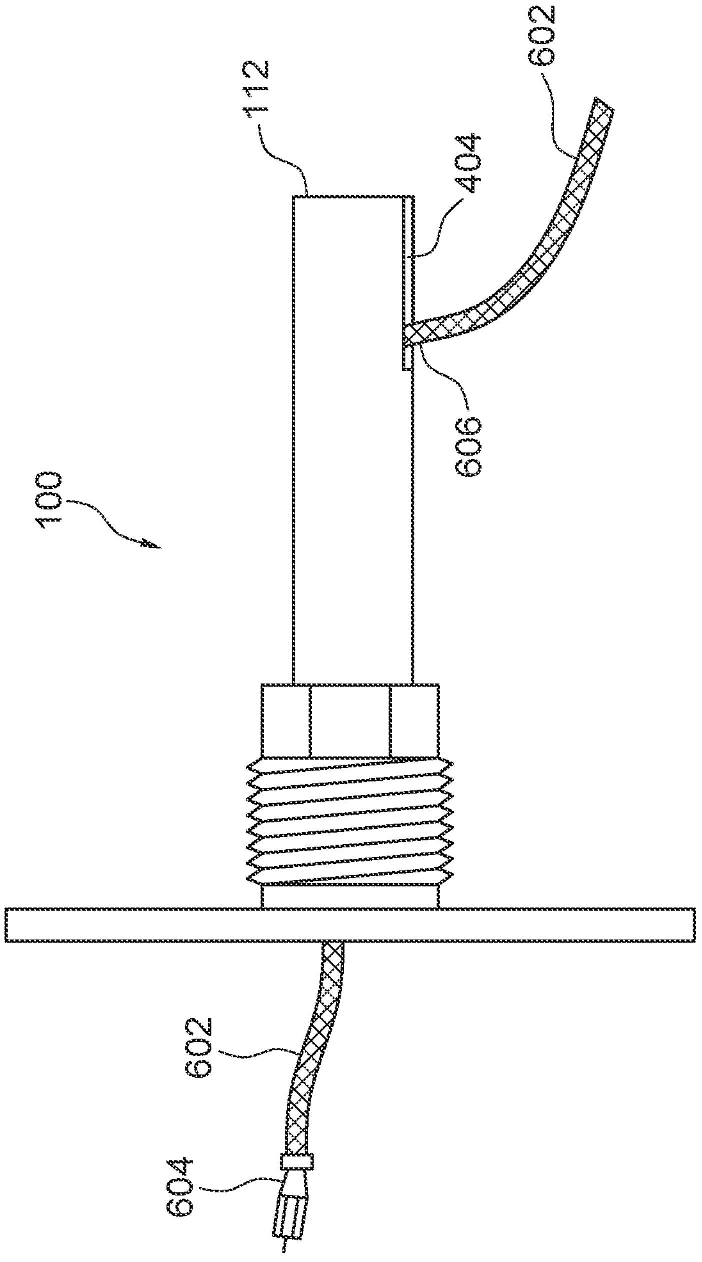
FIG. 6 is a side view of an assembled antenna mount for a structure showing an antenna cable traversing a tortuous path through the antenna mount, in accordance with additional exemplary embodiments of the present disclosure.

In use, with additional reference to FIG. 6, the shaft 108 of the antenna mount 102 can be inserted through the opening 312 in the wall 310 of the structure. An antenna cable 602 can be inserted into the open distal end 112 of the shaft 108 and passed through the cable channel to exit the aperture 106 of the base 104 where a connector 604 at the end of the antenna cable 602 can be connected to the antenna 138 (e.g., by securing the antenna cable connector 604 to the antenna connector 140). The portion 606 of the antenna cable 602 that extends out of the distal end of the shaft may be moved into the cable opening 114. The collar 118 may then be placed over the distal end 112 of the shaft 108 and can bear against the antenna cable 602 that is passing out of the cable opening 114. The collar 118 has a preferably smooth outer surface so as not to damage the antenna cable 602 when positioned against it. The plug 122 is threaded into the distal end 112 of the shaft 108 to seal it closed. The antenna cable 602 passes through the side of the shaft 108 at the cable opening 114 that is not closed off by the collar 118. Thus, the path followed by the antenna cable 602 between the antenna 138 and the interior of the structure is "tortuous," meaning it turns at a substantial angle (e.g., 45 degrees to 90 degrees from the axis of the shaft 108).

Figure 4:
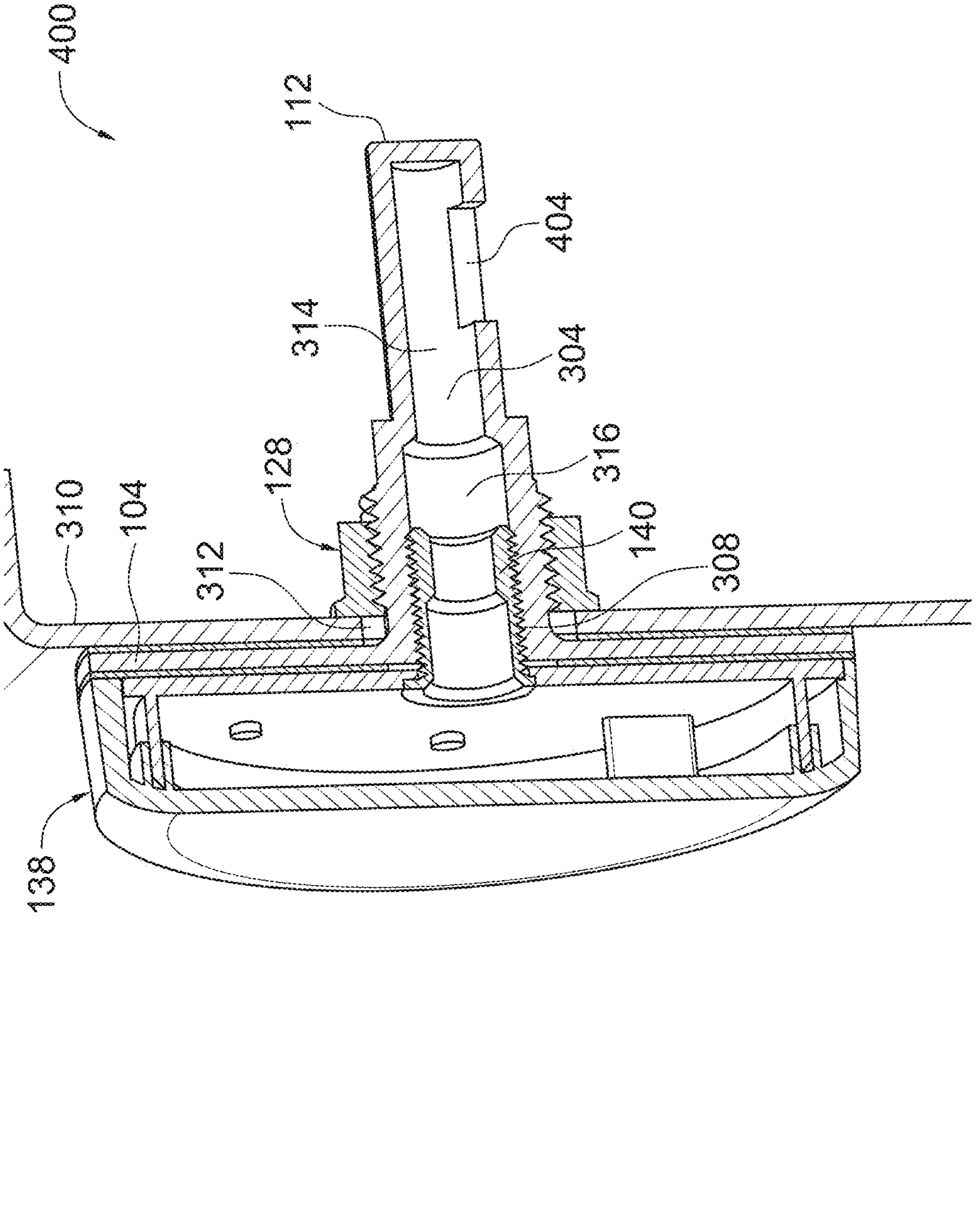
FIG. 4 is a cross-sectional and cutaway view of an antenna connected to an assembled antenna mount for a structure, in accordance with alternative exemplary embodiments of the present disclosure.
Figure 5:
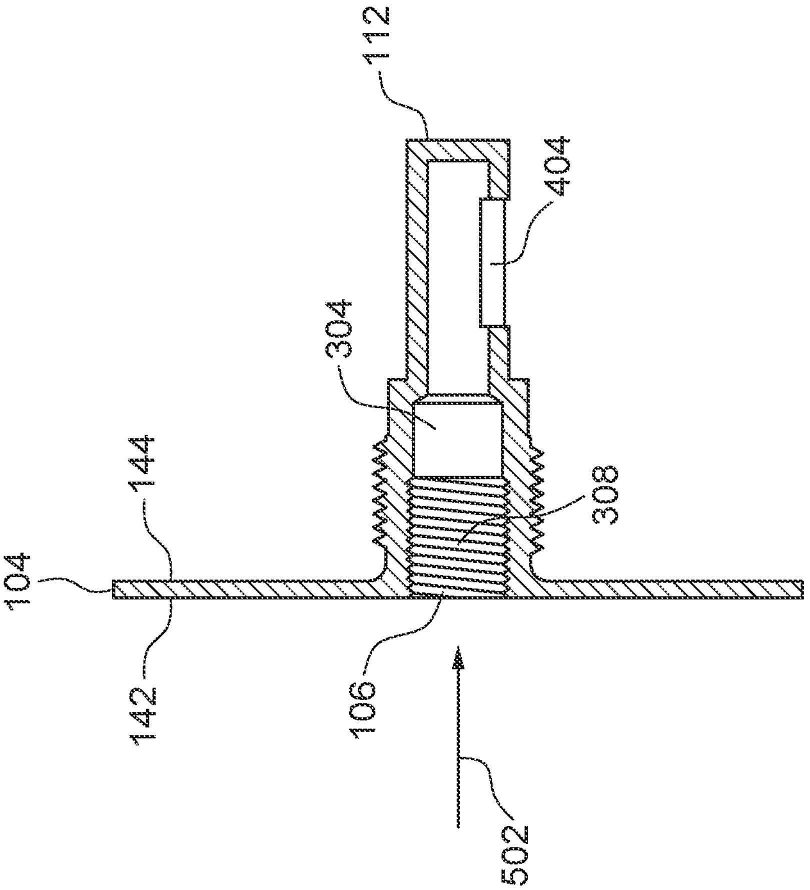
FIG. 5 is a cross-sectional view of the antenna mount included in FIG. 4.

FIG. 4 is a cross-sectional and cutaway view of an antenna 138 connected to an assembled antenna mount 400 for a structure, in accordance with alternative exemplary embodiments of the present disclosure. The antenna mount 400 illustrated in FIG. 4 is similar to the antenna mount 102 shown in FIG. 3, but with a difference in the shaft configuration. As shown in FIG. 4, the distal end 112 of the shaft 108 is permanently sealed closed, rather than being removably sealed closed with a plug 122. The cable opening 404 may be a slot or other opening that passes through the side wall of the shaft but does not extend to the distal end 112 of the shaft. In this embodiment, the cable opening 404 must be large enough to allow the connector 604 of the antenna cable to pass through it. As further shown in FIG. 5, the distal end 112 of the shaft is closed, and the cable opening 404 is contiguous with the cable channel 314 and the aperture 106 in the base 104. The antenna 138 can be attached to the antenna mount 400 by inserting the antenna connector 140 through the aperture 106 in the base 104 as indicated by arrow 502, and then turning the antenna 138 to thread the connector 140 into the cable channel along threads 308.

Figure 7:
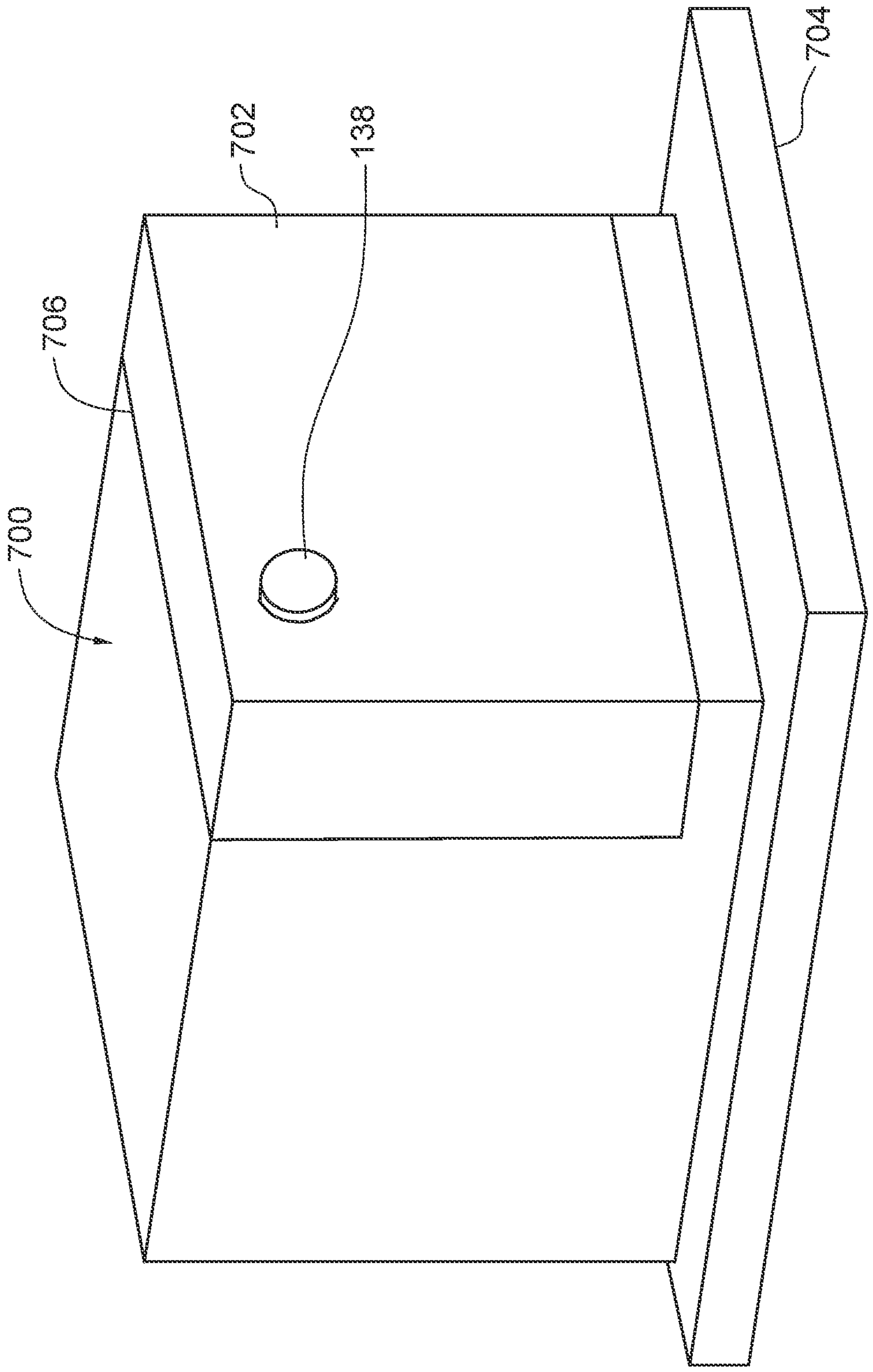
FIG. 7 is a perspective view of an exemplary structure with which an antenna mount in accordance with the present disclosure may be used.

FIG. 7 is a perspective view of an exemplary structure with which an antenna mount in accordance with the present disclosure may be used. The illustrated structure is a pad mounted distribution transformer 700 and is one example of the type of structure in which the pass through antenna mount 102, 400 can be used. The tortuous path created by the antenna mount 102, 400 reduces the chance that a person could insert an object into the shaft of the antenna mount 102, 400, if the antenna 138 was removed, and have the object make contact with something inside the structure. In the case where the structure contains electric utility equipment, there would be a risk of electrical shock if a person were able to insert an object into the structure and make contact with a power carrying component. Typically, a pad mounted distribution transformer 700 is located on a concrete slab 704 and has a front door 702 or hatch that is hinged along a joint 706 such that the door 702 can swing up to expose components inside the structure. The structure is made of metal that is typically grounded and acts as a Faraday cage, preventing radio signals from entering or leaving the structure 700, thus, the external antenna 138 is required for electronics equipment inside the structure 700 to communicate.

Figure 8:
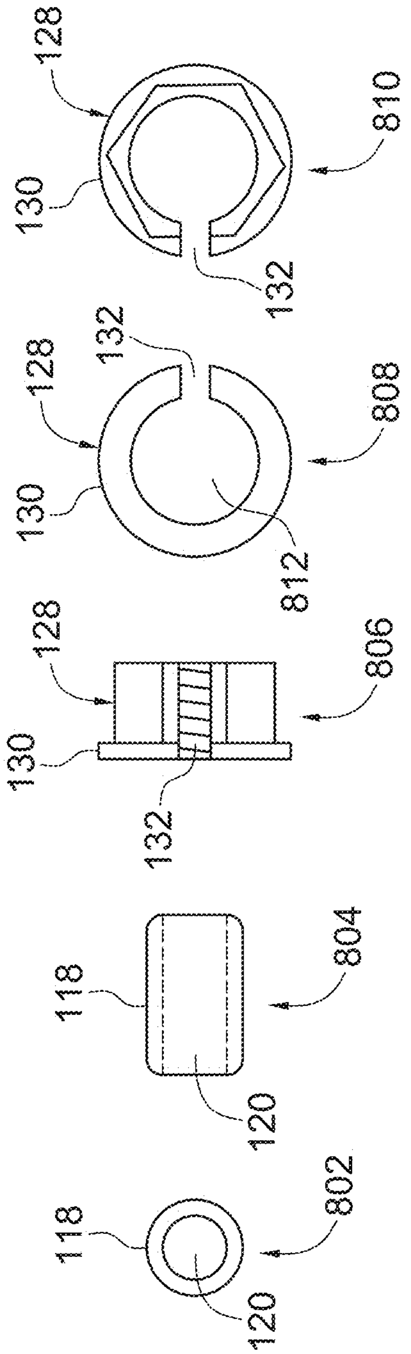
FIG. 8 shows side and end views of an exemplary collar and an exemplary retaining nut for use in an antenna mount for a structure, in accordance with further exemplary embodiments of the present disclosure.

FIG. 8 shows side and end views of an exemplary collar 118 and an exemplary retaining nut 128 for use in an antenna mount 102 for a structure, in accordance with further exemplary embodiments of the present disclosure. FIG. 8 shows several views of the collar 118 and the retaining nut 128. Specifically, view 802 is an end view of the collar 118 looking through the bore 120. View 804 is a side view of the collar 118. View 806 is a side view of the retaining nut 128 showing the gap 132 that allows the retaining nut 128 to be positioned on the neck 110 after an antenna cable 602 has been passed through the antenna mount 102. View 808 is a bottom view of the retaining nut with the flange 130 in view, and view 810 is a top view of the retaining nut 132. With reference to FIGS. 3 and 6, the collar 118 has an internal bore 120 that is sized to allow the collar 118 to fit over the shaft adjacent the distal end 112. The collar 118 may be tapered or conic at each of its opposite ends. The opening 812 through the retaining nut 128 is large enough to fit over the collar 118, having a diameter that is larger than the outer diameter of the collar 118.

A pass-through antenna mount has been disclosed that allows for an external antenna to be mounted on the outside of a structure, where the external antenna is connected by an antenna cable that passes through the antenna mount to a component having radio circuitry that is housed inside the structure. While the pass-through antenna mount passes through a wall of the structure, it also requires the antenna cable to follow a tortuous path, rather than a straight path, through the antenna mount in order to add a level of safety and reduce the risk of someone inserting a foreign object into the antenna mount and making contact with a sensitive or potentially dangerous component in the structure.

The claims appended hereto are meant to cover all modifications and changes within the scope of the present disclosure.

What is claimed is:

1. An antenna mount for a structure, the antenna mount comprising:

a base defining an aperture therethrough;

a shaft extending away from the base, the shaft defining a hollow channel extending along a length thereof and being generally aligned with the aperture in the base, the shaft including a neck portion and an adjacent body portion, the neck portion configured to accept a fastener, the body portion defining a cable opening in a wall thereof, the cable opening fluidly communicating with the hollow channel, wherein an outer surface of the neck portion is threaded; and a nut sized to fit onto and mate with the threaded outer surface of the neck portion, wherein the nut defines a gap in a wall thereof, a width of the gap accommodating passage of a cable therethrough.

2. The antenna mount of claim 1, wherein a distal end of the shaft is sealed closed.

3. The antenna mount of claim 1, further comprising:

a plug removably attached to a distal end of the body portion of the shaft, the plug being sized and shaped to seal closed the distal end of the body portion.

4. The antenna mount of claim 3, wherein an inner surface of the body portion of the shaft is threaded proximate the distal end of the body portion and wherein the plug includes:

a threaded member; and a head member located at one end of the threaded member, the head member being sized and shaped to seal closed the distal end of the body portion of the shaft when the threaded member of the plug is mated with the threaded inner surface of the body portion.

5. The antenna mount of claim 3, further comprising:

a collar sized and shaped to fit over the body portion of the shaft, the collar being positioned between the head member of the plug and the neck portion of the shaft, at least a portion of the collar having an outer diameter that is less than a diameter of the head member of the plug.

6. The antenna mount of claim 1, wherein at least the base is configured to facilitate attachment of an antenna assembly such that one or more cables of the antenna assembly pass through the aperture of the base and into the hollow channel of the shaft.

7. The antenna mount of claim 1, wherein the body portion of the shaft is generally cylindrical and wherein the hollow channel is a bore.

8. An antenna mount for a structure, the antenna mount comprising:

a base defining an aperture therethrough;

a shaft extending away from the base, the shaft defining a hollow channel extending along a length thereof and being generally aligned with the aperture in the base, the shaft including a neck portion and an adjacent body portion, the neck portion configured to accept a fastener, the body portion defining a cable opening in a wall thereof, the cable opening fluidly communicating with the hollow channel, wherein an outer surface of the neck portion is threaded;

a plug removably attached to a distal end of the body portion of the shaft, the plug being sized and shaped to seal closed the distal end of the body portion;

a collar sized and shaped to fit over the body portion of the shaft, the collar being positioned between the head member of the plug and the neck portion of the shaft, at least a portion of the collar having an outer diameter that is less than a diameter of the head member of the plug; and a nut sized to fit onto and mate with the threaded outer surface of the neck portion, wherein an inside diameter of the nut is larger than a maximum outside diameter of the collar and the diameter of the head member of the plug.

9. An antenna mount for a structure, the antenna mount comprising:

a base defining an aperture therethrough; and a shaft extending away from the base, the shaft defining a hollow channel extending along a length thereof and being generally aligned with the aperture in the base, the shaft including a neck portion and an adjacent body portion, the neck portion configured to accept a fastener, the body portion defining a cable opening in a wall thereof, the cable opening fluidly communicating with the hollow channel, wherein the body portion of the shaft is generally cylindrical and has a smaller diameter than a diameter of the neck portion of the shaft and wherein the hollow channel is a bore.

10. An antenna mount for a structure, the antenna mount comprising:

a substantially flat base defining an opening therethrough;

a shaft extending away from the base, the shaft defining a bore extending along a length thereof and being generally aligned with the opening in the base, the shaft including a neck portion and a body portion, one side of the neck portion being adjacent to the body portion and another side of the neck portion being adjacent to the base, an outside surface of the neck portion being threaded, the body portion defining a slot in a wall thereof and being open at a distal end thereof, the slot fluidly communicating with the bore, wherein an inner surface of the body portion is threaded proximate the distal end thereof; and a plug removably attached to the body portion of the shaft through the open distal end of the body portion, the plug including:

a threaded member having threads sized to mate with the threaded inner surface of the body portion of the shaft; and a head member located at one end of the threaded member, the head member being sized and shaped to seal closed the distal end of the body portion of the shaft when the threaded member is mated with the threaded inner surface of the body portion of the shaft.

11. The antenna mount of claim 10, wherein the plug is attached to the body portion of the shaft so as to be unremovable in response to an impact force originating from the bore of the shaft.

12. The antenna mount of claim 10, further comprising:

a collar sized and shaped to fit over the body portion of the shaft, the collar being positioned between a head member of the plug and the neck portion of the shaft, at least a portion of the collar having an outer diameter that is less than a diameter of the head member of the plug.

13. The antenna mount of claim 12, wherein an end portion of the collar positioned closest to the head member of the plug is tapered.

14. The antenna mount of claim 12, wherein an outer surface of the neck portion of the shaft is threaded, the antenna mount further comprising:

a nut sized to fit onto and mate with the threaded outer surface of the neck portion, wherein an inside diameter of the nut is larger than a maximum outside diameter of the collar and the diameter of the head member of the plug.

15. The antenna mount of claim 14, wherein the nut defines a gap in a wall thereof, a width of the gap accommodating passage of a cable therethrough.

16. An antenna mount for a structure, the antenna mount comprising:

a substantially flat base defining an opening therethrough, wherein a wall of the base defining the opening is threaded to be mateable with a threaded portion of an antenna assembly;

a shaft extending away from the base, the shaft defining a bore extending along a length thereof and being generally aligned with the opening in the base, the shaft including a neck portion and a body portion, one side of the neck portion being adjacent to the body portion and another side of the neck portion being adjacent to the base, an outside surface of the neck portion being threaded, the body portion defining a slot in a wall thereof and being open at a distal end thereof, the slot fluidly communicating with the bore; and a plug removably attached to the body portion of the shaft through the open distal end of the body portion, the plug being sized and shaped to seal closed the open distal end of the body portion.

17. An intrusion-resistant antenna mount for a structure, the antenna mount being mountable through an aperture of the structure, the antenna mount comprising:

a base defining an opening therethrough; and a tortuous path arrangement connected to and extending away from the base, the tortuous path arrangement including:

a shaft defining a hollow cable channel extending along a length thereof and being generally aligned with the opening in the base, the shaft further being open at a distal end and defining a cable opening in a wall thereof, the cable opening fluidly communicating with the cable channel;

a cylindrical collar tapered at one or more ends and positioned over the shaft; and a plug removably attached to the distal end of the shaft, the plug including a head member sized and shaped to seal closed the distal end of the shaft, wherein the head member has a diameter greater than a diameter of a tapered end of the collar.

* * * * *